United States Patent
Kang et al.

(10) Patent No.: US 9,628,774 B2
(45) Date of Patent: Apr. 18, 2017

(54) IMAGE PROCESSING METHOD AND APPARATUS

(71) Applicant: SAMSUNG ELECTRONICS CO., LTD., Suwon-si (KR)

(72) Inventors: Byong Min Kang, Yongin-si (KR); Do Kyoon Kim, Seongnam-si (KR); Kee Chang Lee, Yongin-si (KR)

(73) Assignee: SAMSUNG EKECTRONICS CO., LTD., Gyeonggi-Do (KR)

( * ) Notice: Subject to any disclaimer, the term of this patent is extended or adjusted under 35 U.S.C. 154(b) by 736 days.

(21) Appl. No.: 13/963,385

(22) Filed: Aug. 9, 2013

(65) Prior Publication Data

US 2014/0184746 A1  Jul. 3, 2014

(30) Foreign Application Priority Data

Dec. 28, 2012  (KR) .................. 10-2012-0156282

(51) Int. Cl.
*H04N 5/357* (2011.01)
*H04N 13/02* (2006.01)
*G01S 17/08* (2006.01)
*G01S 17/89* (2006.01)

(52) U.S. Cl.
CPC ......... *H04N 13/0203* (2013.01); *G01S 17/08* (2013.01); *G01S 17/89* (2013.01)

(58) Field of Classification Search
None
See application file for complete search history.

(56) References Cited

U.S. PATENT DOCUMENTS

| 6,580,496 B2 * | 6/2003 | Bamji | G01S 17/36 356/141.1 |
| 2006/0176467 A1 * | 8/2006 | Rafii | G01C 3/08 356/4.07 |
| 2007/0158770 A1 | 7/2007 | Kawahito | |
| 2012/0121165 A1 | 5/2012 | Ko et al. | |
| 2012/0169848 A1 * | 7/2012 | Bae | G01S 7/4861 348/46 |
| 2012/0176476 A1 * | 7/2012 | Schmidt | G01S 17/89 348/46 |

FOREIGN PATENT DOCUMENTS

| JP | 06-011937 | 1/1994 |
| JP | 2012-108454 | 6/2012 |
| KR | 10-2012-0014925 | 2/2012 |

* cited by examiner

*Primary Examiner* — Kate Luo
(74) *Attorney, Agent, or Firm* — Harness, Dickey & Pierce, PLC (57) ABSTRACT

An image processing apparatus is provided. The image processing apparatus determines whether a first charge quantity of charges stored in a first charge storage is greater than or equal to a predetermined saturation level, the first charge storage among a plurality of charge storages configured to store charges generated by a sensor of a depth camera. According to the determination result, when the first charge quantity is greater than or equal to the saturation level, the image processing apparatus may calculate the first charge quantity from at least one second charge quantity of charges stored in at least one second charge storage which is different from the first charge storage among the plurality of charge storages.

21 Claims, 11 Drawing Sheets

FIG. 11

IMAGE PROCESSING METHOD AND APPARATUS

CROSS-REFERENCE TO RELATED APPLICATIONS

This application claims the priority benefit of Korean Patent Application No. 10-2012-0156282, filed on Dec. 28, 2012, in the Korean Intellectual Property Office, the disclosure of which is incorporated herein by reference.

BACKGROUND

1. Field

One or more example embodiments of the following description relate to an image processing apparatus and method, and more particularly to, an apparatus and method for correcting a depth error generated by saturation during the obtaining of a depth image.

2. Description of the Related Art

Methods of obtaining a depth image using emitted light include two example methods. One is a triangulation method that emits light to an object and uses an incident angle and a reflection angle of the light to determine depth of the object.

The other one is a time of flight (TOF) method that emits light to an object and measured the time taken for the light to be reflected from the object to determine depth of the object.

The TOF method may generate a depth image in real time since it takes a shorter time for a TOF measurement than the time required for the triangulation calculations.

However, according to the TOF method, distortion of a depth value may occur in the depth image due to saturation caused, for example, by an insufficient photographing distance of the object or high degree of reflection from the object.

SUMMARY

According to example embodiments, there may be provided an image processing apparatus including a compensation unit to calculate a first charge quantity of charges generated by a sensor and stored at a first phase from a second charge quantity of charges stored at a second phase, and an image generation unit to generate a depth image using at least one of the first charge quantity and the second charge quantity.

The image processing apparatus may further include a determination unit to determine whether the first charge quantity is greater than or equal to a predetermined saturation level.

The compensation unit may calculate the first charge quantity from the second charge quantity when the first charge quantity is greater than or equal to the predetermined saturation level.

When the first charge quantity is smaller than the saturation level, the compensation unit may determine the measured value of the first charge quantity as the first charge quantity. In this case, compensation of the first charge quantity, that is, calculation of the first charge quantity from the second charge quantity, may be omitted.

The second charge quantity may refer to a charge quantity of charges stored at a plurality of phases different from the first phase, among a plurality of phases at which the charges generated by the sensor are stored.

The plurality of phases include 0 degrees which is a reference phase, and 90 degrees, 180 degrees, and 270 degrees which are different from the reference phase.

The first phase may be any one of the 0 degrees and the 90 degrees.

The compensation unit may calculate the first charge quantity to be a value obtained by subtracting a charge quantity of the 180 degrees from a sum of a charge quantity of the 90 degrees and a charge quantity of the 270 degrees, when the first phase is 0 degrees.

The compensation unit may calculate the first charge quantity to be a value obtained by subtracting a charge quantity of the 270 degrees from a sum of a charge quantity of the 0 degrees and a charge quantity of the 180 degrees, when the first phase is 90 degrees.

The image generation unit may generate the depth image using a time of flight (TOF) method.

The image processing apparatus of claim 2, wherein the predetermined saturation level relates to capacitance of a charge storage to adapted store the charges generated by the sensor.

The predetermined saturation level may be experimentally determined. For example, when the charges generated by the sensor and stored in the first charge storage are increased according to increase in light input to the sensor and stop increasing, the charges may reach the predetermined saturation level.

The predetermined saturation level may be smaller than the capacitance by a predetermined margin.

According to example embodiments, there may be also provided an image processing method including compensating to calculate a first charge quantity of charges generated by a sensor and stored at a first phase from a second charge quantity of charges stored at a second phase when the first charge quantity is greater than or equal to a predetermined saturation level, and image generating to generate a depth image using at least one of the first charge quantity and the second charge quantity.

The second charge quantity may refer to a charge quantity of charges stored at a plurality of phases different from the first phase, among a plurality of phases at which the charges generated by the sensor are stored.

The plurality of phases may include 0 degrees which is a reference phase, and 90 degrees, 180 degrees, and 270 degrees which are different from the reference phase.

The first phase may be any one of the 0 degrees and the 90 degrees.

The compensating may calculate the first charge quantity to be a value obtained by subtracting a charge quantity of the 180 degrees from a sum of a charge quantity of the 90 degrees and a charge quantity of the 270 degrees, when the first phase is 0 degrees.

The compensating may calculate the first charge quantity to be a value obtained by subtracting a charge quantity of the 270 degrees from a sum of a charge quantity of the 0 degrees and a charge quantity of the 180 degrees, when the first phase is 90 degrees.

The predetermined saturation level may be proportional to capacitance of a charge storage adapted to store the charges generated by the sensor.

According to example embodiments, a method of compensating for saturation in a sensor of a depth sensing camera may be also be provided. The method may include determining whether a first charge quantity generated by the sensor is saturated by comparing the charge quantity with a predetermined saturation level, selectively calculating, by way of a processor, a depth value using a first technique when the first charge quantity is determined as unsaturated and calculating the depth value using a second technique when the first charge quantity is determined as saturated.

According to example embodiments, apparatus compensating for saturation in a sensor of a depth sensing camera may be also be provided. The apparatus may include a determination unit to determine whether a first charge quantity generated by the sensor is saturated by comparing the first charge quantity with a predetermined saturation level, a compensation unit to calculate the first charge quantity from a second charge quantity when the determination unit determines the first charge quantity to be greater than or equal to the predetermined saturation level, and an image generation unit to to generate a depth value using the first charge quantity calculated by the compensation unit.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. However, aspects of the disclosure are not limited to the example embodiments.

Figure 1:
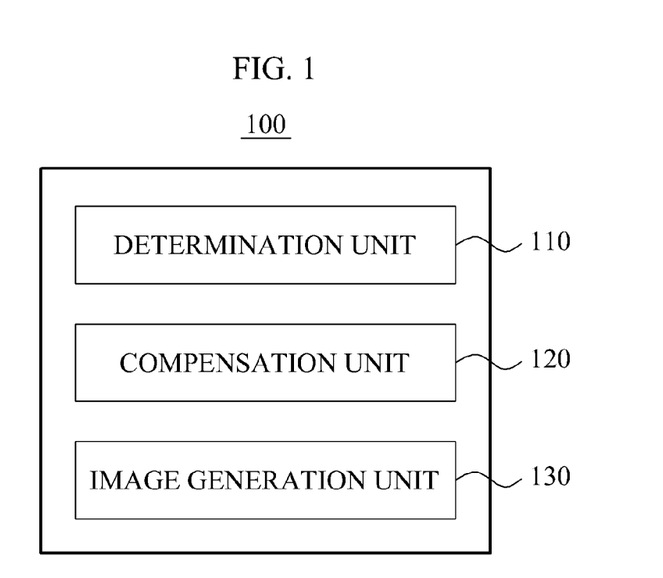
FIG. 1 illustrates a block diagram of an image processing apparatus according to example embodiments.

FIG. 1 illustrates a block diagram of an image processing apparatus 100 according to example embodiments.

According to the example embodiments, for example when at least one of charge storage device included in a depth sensor is saturated, the image processing apparatus 100 may calculate an accurate quantity of charges by compensating for the saturation. Hereinafter, an example case in which pixels of a sensor of a depth camera are saturated will be described. However, other types of applications or devices are not excluded. That is, the example embodiments may be applied to a camera capable of obtaining both depth data and color data.

A determination unit 110 of the image processing apparatus 100 may determine whether a charge storage is saturated at any one phase when charges generated by the sensor of the depth camera are stored in the charge storage at different phases. Hereinafter, the charge storage in which a saturation state is to be determined will be referred to as a "first charge storage."

Here, the first charge storage may be a capacitor adapted to store charges transmitted at 0 degrees, which is a reference phase in a time of flight (TOF) type depth camera. The camera type, the charge storage, and the like may be varied, and thus are not limited to the embodiments described here.

When the charge quantity of the charges stored in the first charge storage is greater than or equal to a predetermined threshold or level of saturation, the determination unit 110 may determine the first charge storage to be saturated.

According to the example embodiments, the predetermined saturation level may be determined through experiments. For example, when the charges generated by the sensor and stored in the first charge storage are increased according to an increase in light input to the sensor and then stop increasing, the charges may reach the predetermined saturation level. Also, the predetermined saturation level may refer to a charge quantity at which linearity is lost.

The saturation level may be equal to capacitance of the first charge storage. Alternatively, the saturation level may be smaller than the capacitance of the first charge storage.

For example, the saturation level may be determined to be smaller than the capacitance of the first charge storage by a predetermined margin.

The saturation level may be proportional to the capacitance of the first charge storage. Methods for determining the saturation level have been described. However, the described methods are not limiting and the saturation level may alternatively be determined by other methods.

A charge quantity generated by the sensor at a plurality of different phases may be measured for a TOF type depth calculation.

When the first charge quantity stored in the first charge storage is greater than or equal to the saturation level, a compensation unit 120 of the image processing apparatus 100 may compensate for the first charge quantity.

The compensation may be performed when the first charge storage is saturated and therefore the measured first charge quantity is unreliable.

In this case, the measured first charge quantity may not be used for the depth calculation due to the saturation. Instead, the compensation may be performed, for example, by calculating the first charge quantity from a charge quantity measured at another phase, that is, a second charge quantity.

The plurality of phases may be different phases for measuring a charge quantity for the TOF type depth calculation.

For example according to a 4 phase type, the plurality of phases may include 0 degrees, which is the reference phase, and 90 degrees, 180 degrees, and 270 degrees. For simplicity, hereinafter, a charge quantity measured at the phase of 0 degrees will be denoted as $Q0°$ and a charge quantity measured at the phase of 90 degrees will be denoted as $Q90°$.

In the same manner, a charge quantity measured at the phase of 180 degrees will be denoted as Q180° and a charge quantity measured at the phase of 270 degrees will be denoted as Q270°.

Among the plurality of charge quantities being measured, when a charge quantity measured at any one phase is greater than or equal to the saturation level, the compensation unit 120 may compensate for the charge quantity measured at the saturated phase, e.g., by substituting a charge quantity measured at a different phase.

Therefore, an image generation unit 130 of the image processing apparatus 100 may generate an accurate depth image using the compensated charge quantity.

The operation of the compensation unit 120 will be described in detail with reference to FIGS. 3 to 10.

Figure 2:
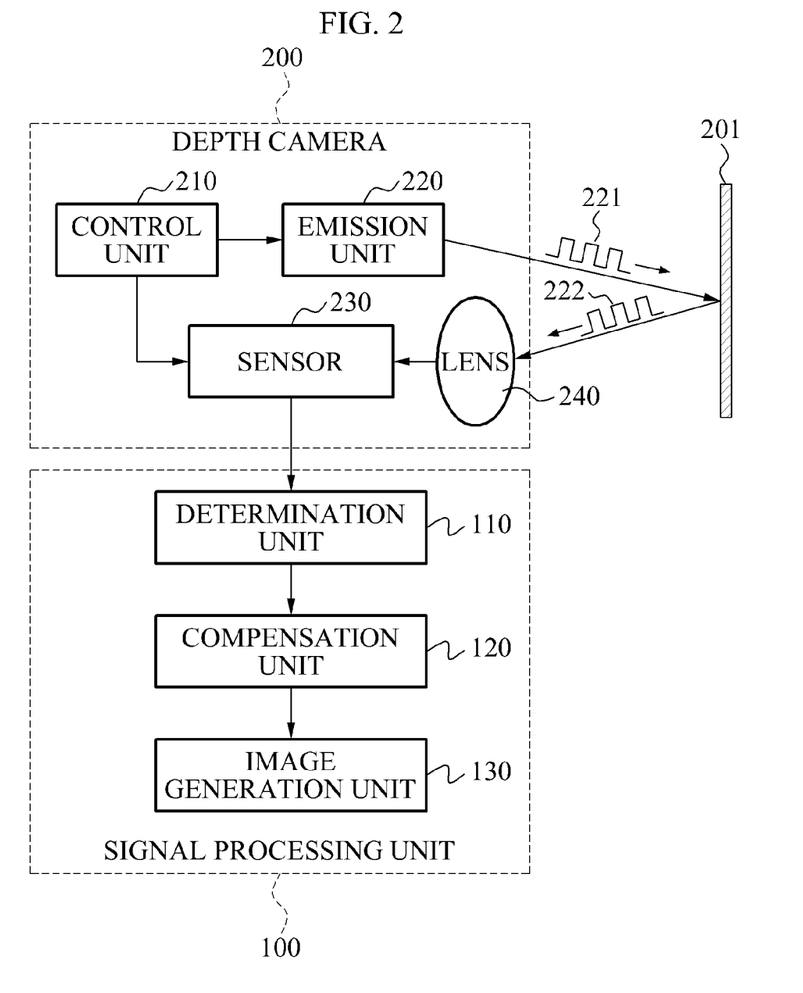
FIG. 2 illustrates an operation of the image processing apparatus of FIG. 1.

FIG. 2 illustrates an operation of the image processing apparatus 100.

The image processing apparatus 100 may compensate for distortion of a depth value occurring when a charge storage is saturated at a certain phase, such as for charges generated by a sensor 230 of a depth camera 200.

The image processing apparatus 100 may embedded in the depth camera 200 or may be connected to the depth camera 200, either via wires or wirelessly.

Under control of a control unit 210 of the depth camera 200, an emission unit 220 may emit light, for example, infrared (IR) 221.

The light emitted by the emission unit 210 to an object 201 for depth measurement may include near IR (NIR), ultraviolet (UV), visible rays, and the like. That is, the light is not specifically limited.

The emission unit 210 may be implemented using a light emitting diode (LED) array, a laser device, or the like.

The IR 221 may be reflected from the object 201 and condensed to a lens 240 in the form of a reflected light 222.

The lens 240 may transfer the reflected light 222 to the sensor 230. The sensor 230 may convert the reflected light 222 into charge. That is, the sensor 230 is a device adapted to convert input light energy into charge.

The sensor 230 may include a photo diode array or a photo gate array, for example.

Hereinafter, a description will be made presuming that pixels of the sensor 230 include the photo diode array. However, this is only by way of example. Therefore, other embodiments employing the sensor 230 in other configurations are not excluded.

The image processing apparatus 100 may be understood as a signal processing module adapted to generate a depth image from charges generated by the sensor 230 using values measured at different phases according to the TOF method.

The operation of the image processing apparatus 100 will be described with reference to FIG. 3.

Figure 3:
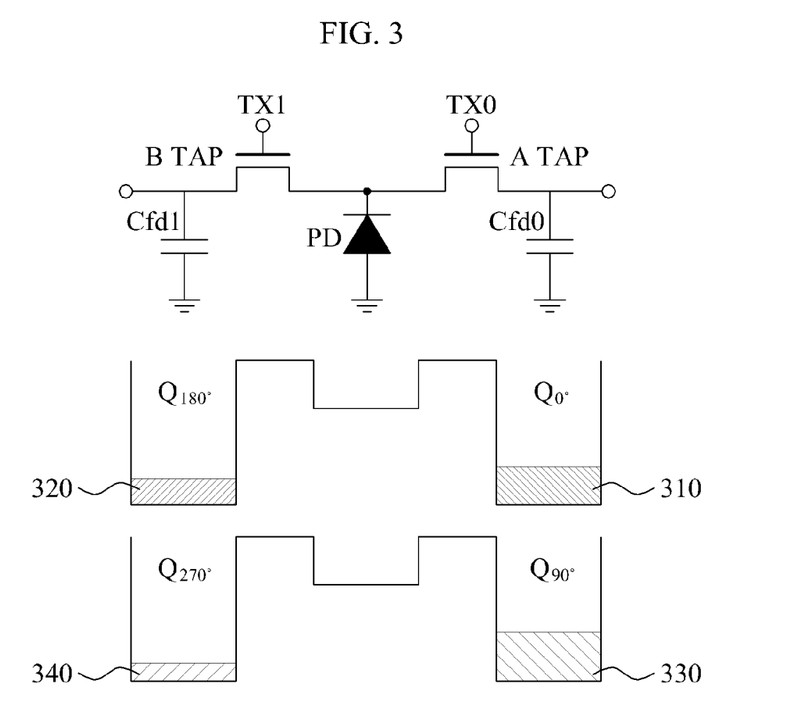
FIG. 3 illustrates a pixel structure and quantity of stored charges in an example of a 2 tap/4 phase type according to example embodiments.

FIG. 3 illustrates a pixel structure and quantity of stored charges in an example of a 2 tap/4 phase type according to example embodiments.

The depth may be calculated according to the TOF method using a difference in the charge quantity of charges measured at a plurality of phases.

In the 2 tap structure, a transmission gate TX1 may be added to separate charge quantities stored at different phases.

Transmission gates TX0 and TX1 may store charges that a photodiode (PD) generates by receiving the reflected light 222 at complementary time periods, in capacitors Cfd0 and Cfd1, respectively. For example, the transmission gate TX0 may transmit the charge quantity of the charges generated by the PD to the capacitor Cfd0 and store the charge quantity in the capacitor Cfd0 at 0 degrees, which is a reference phase. The transmission gate TX1 may transmit the charge quantity of the charges generated by the PD and store the charge quantity in the capacitor Cfd1 at 180 degrees.

For example, referring to FIG. 3 showing the 2 tap/4 phase type, the charge quantity transmitted to and stored in the capacitor Cfd0 at 0 degrees by the transmission gate TX0 may be Q0° 310. The charge quantity transmitted to and stored in the capacitor Cfd1 at 180 degrees by the transmission gate TX1 may be Q180° 320.

In the 2 tap structure, the charge quantity of the 4 phases may be measured twice by the capacitors Cfd0 and Cfd1. For example, the transmission gates TX0 and TX1 may store the charges generated by the PD still at the complementary time periods in the capacitors Cfd0 and Cfd1 in a state in which the phase is delayed by 90 degrees. That is, the transmission gate TX0 transmits and stores the charges at 90 degrees and the transmission gate TX1 transmits and stores the charges at 270 degrees.

The charge quantity of the charges transmitted to and stored in the capacitor Cfd0 by the transmission gate TX0 at 90 degrees may be Q90° 330. The charge quantity of the charges transmitted to and stored in the capacitor Cfd1 by the transmission gate TX1 at 270 degrees may be Q270° 340.

The 2 tap/4 phase type has been described merely as an example embodiment. Therefore, 4 phases may be implemented by varying the phase in a 1 tap structure. In a 4 tap structure, taps may measure charges corresponding to different phases, respectively. That is, various other structures and measurement methods may be applied besides the 2 tap/4 phase type.

The operation of controlling the transmission gate TX0 and TX1 and transmitting and storing the charges according to the 2 tap/4 phase type will be described in detail with reference to FIGS. 4A to 4D.

FIGS. 4A to 4D illustrate waveforms of gate control signals and charges stored at each phase in the 2 tap/4 phase type according to example embodiments.

Figure 4A:
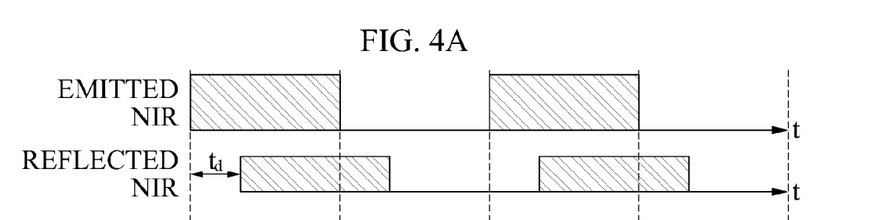
FIGS. 4A, 4B, 4C, and 4D illustrate waveforms of gate control signals and charges stored at each phase in the 2 tap/4 phase type according to example embodiments.

Referring to FIG. 4A, an emitted NIR and a reflected NIR may have a time difference or phase difference as much as $t_d$.

The time difference $t_d$ may be proportional to a distance between the emission unit 220 and the sensor 230. Since the distance is proportional to a TOF of the light, a distance depth may be calculated as follows using a constant C ($C=3\times10^8$ m/s) denoting a velocity of light.

$$\text{Depth} = \tfrac{1}{2} \times \text{velocity of light } (C) \times \text{time difference } (t_d) \quad [\text{Equation 1}]$$

The time difference $t_d$ may be calculated by measuring and comparing the Q0°, the Q90°, the Q180° and the Q270°.

Figure 4B:
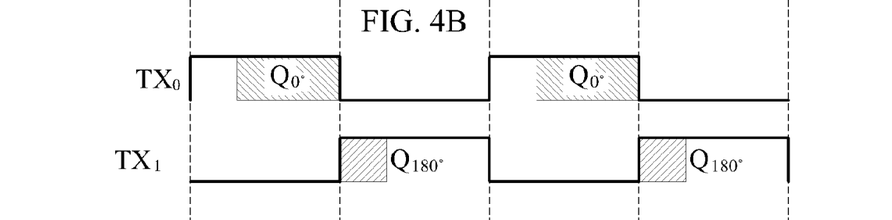
Figure 4C:
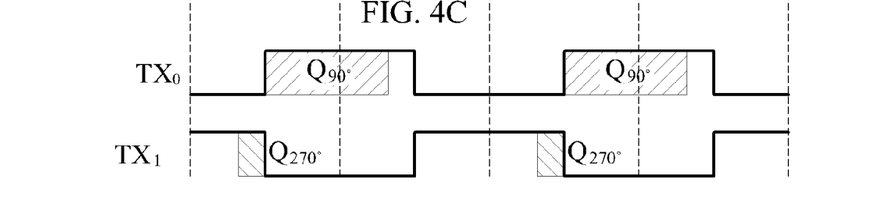

Referring to FIGS. 4B and 4C, the Q0°, the Q90°, the Q180° and the Q270° may be measured via two iterations of signal application and control.

For example in the 2 tap/4 phase type, the transmission gate TX0 may transmit the charges twice, that is, at 0 degrees)(Q0° and 90 degrees)(Q90° while the transmission gate TX1 transmits the charges twice, that is, at 180 degrees) (Q180° and 270 degrees)(Q270°.

Since a 1 tap/4 phase type includes one tap and one transmission gate, the transmission gate TX1 may be absent. In this case, in FIGS. 4B and 4C, it may be understood that only the transmission gate TX0 is included instead of the transmission gate TX1.

In case of a 4 tap/4 phase type, four taps and four transmission gates may be included. Therefore, transmission gates TX2 and TX3 may be present in addition to the transmission gates TX0 and TX1. In this case, in FIG. 4C, the transmission gate TX2 may replace the transmission gate TX0 and the transmission gate TX3 may replace the transmission gate TX1.

Figure 4D:
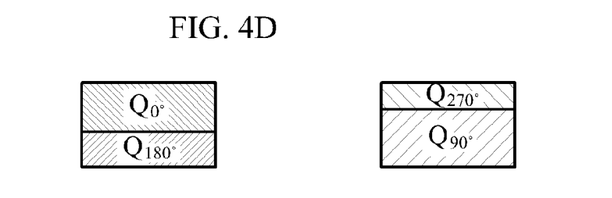

The transmitted charges may be stored as shown in FIG. 4D.

Accordingly, the depth value proportional to the time difference $t_d$ may be calculated as follows.

$$\text{Depth} = \tan^{-1}\left(\frac{Q_{90°} - Q_{270°}}{Q_{0°} - Q_{180°}}\right) \times R_{max} \qquad \text{[Equation 2]}$$

Here, $R_{max}$ denotes a theoretical maximum distance obtainable by a depth sensor using a modulation frequency and the velocity of light.

For example, when the modulation frequency is 30 MHz, $R_{max}$ may be 5 m. When the modulation frequency is 20 MHz, $R_{max}$ may be 7.5 m.

The image generation apparatus 130 of FIG. 1 may calculate depth values corresponding to respective pixels using Equation 2.

When a distance to the object is relatively short and therefore excessive reflected light is input, the pixels may be saturated, thereby causing an error in the calculated value.

A pixel saturation process will be described with reference to FIGS. 5 to 10.

Figure 5:
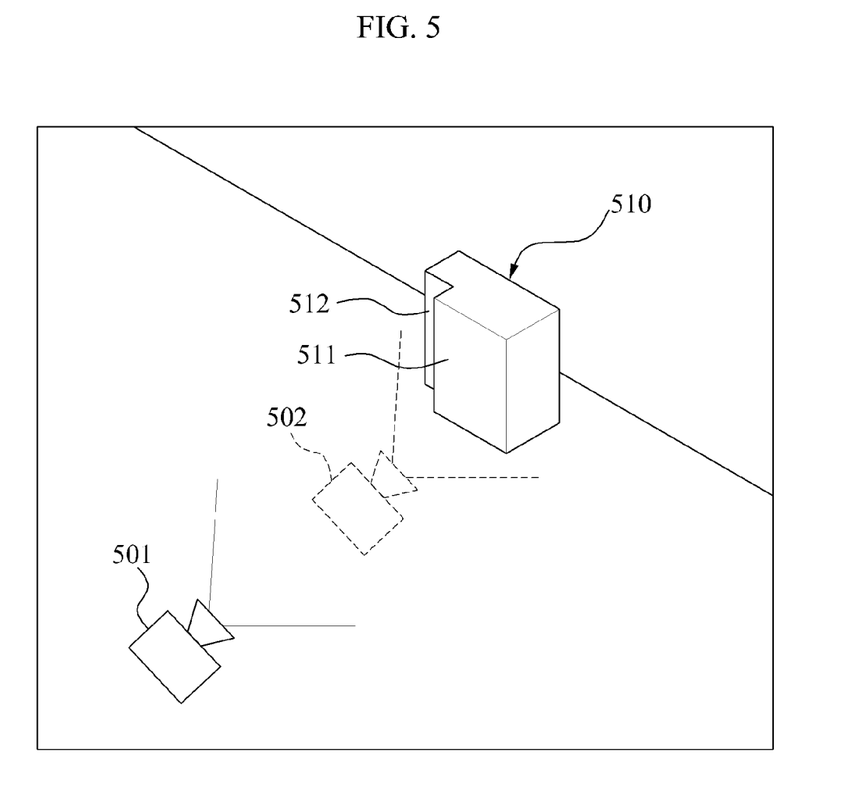
FIG. 5 illustrates an operation of an image processing apparatus according to example embodiments.

FIG. 5 illustrates an operation of an image processing apparatus according to example embodiments.

When an object 510 is photographed by a depth camera 501, a surface 511 disposed relatively near to the depth camera 510 may have a different value from a surface 512 disposed relatively far from the depth camera 510.

When the depth camera 501 gradually approaches the object, for example, when the depth camera 501 is disposed at a position 502, one or more of the pixels may be saturated due to excessive reflected light.

Figure 6:
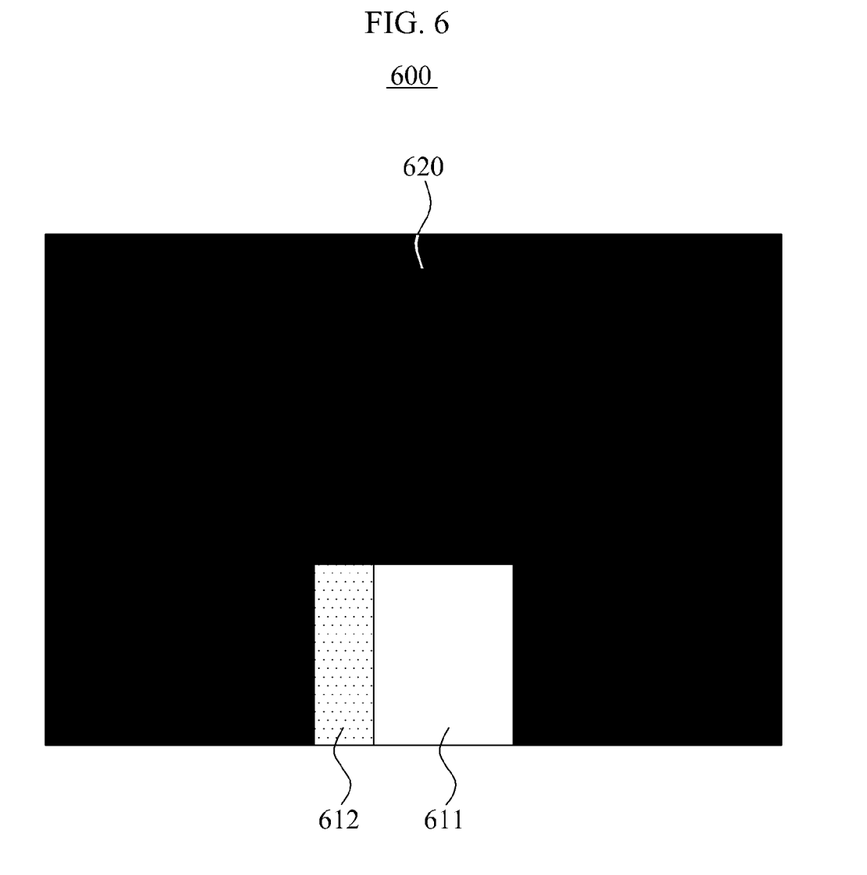
FIG. 6 illustrates a depth image obtained according to example embodiments.

FIG. 6 illustrates a diagram 600 describing a depth image obtained according to example embodiments.

When the depth camera 501 of FIG. 5 photographs the object 510 and generates the depth image, when a distance between the depth camera 501 and the object 510 is within a proper range, pixel saturation or depth folding may not occur.

In this case, not only may object regions 611 and 612 in the depth image be distinguished from a background region 620 but also the object regions 611 and 612 may be distinguished from each other.

This is because the object region 611 corresponds to the surface 511 and the object region 612 corresponds to the surface 512, and the surfaces 511 and 512 are disposed at different distances from the depth camera 501.

However, when the depth camera 501 approaches the object 510, for example, when the depth camera 501 is disposed at position 502, the objects regions may not be clearly distinguished because at least a part of the pixels may be saturated due to excessive reflected light.

Figure 7:
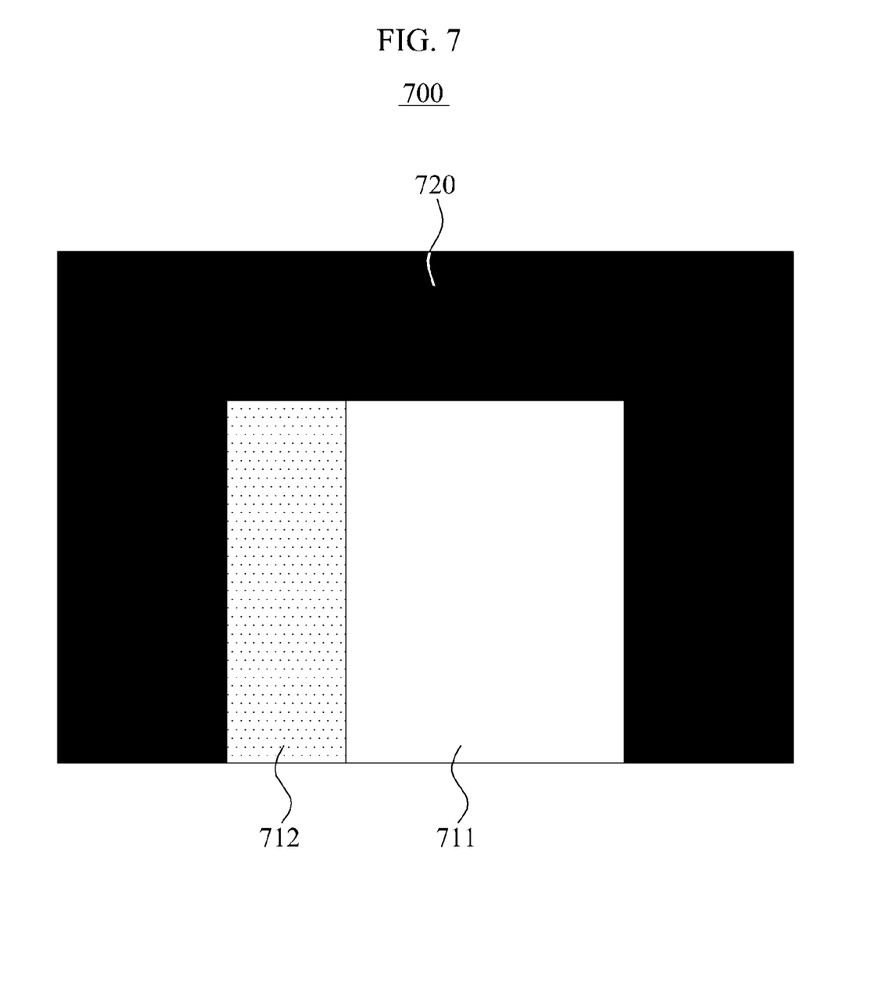
FIG. 7 illustrates another depth image obtained when an object is located nearer than in the depth image of FIG. 6, according to example embodiments.

FIG. 7 illustrates a diagram 700 describing another depth image obtained when an object is located nearer than the depth image of FIG. 6, according to example embodiments.

When the depth camera 501 photographs the object 510 at the position 502 without any error such as pixel saturation, as shown in FIG. 7, object regions 711 and 712 may be distinguished, not only from a background region 720, but also from each other.

However, the object regions 711 and 712 may not be distinguishable from each other when pixel saturation or the like occurs.

Figure 8A:
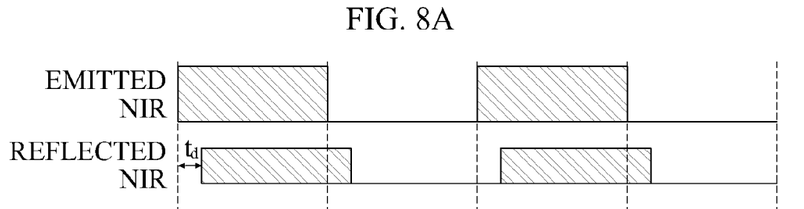
FIGS. 8A, 8B, and 8C illustrate phases of when the object is located near in a 2 tap/4 phase type, along with waveforms of control signals, according to example embodiments.
Figure 8B:
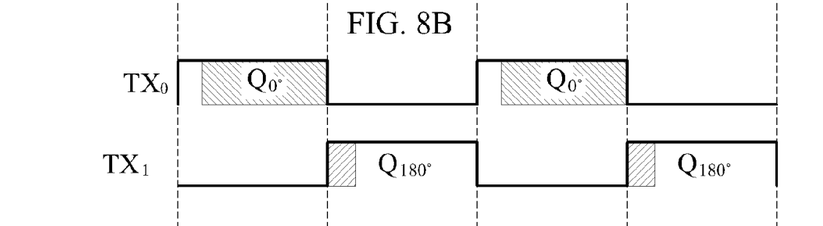
Figure 8C:
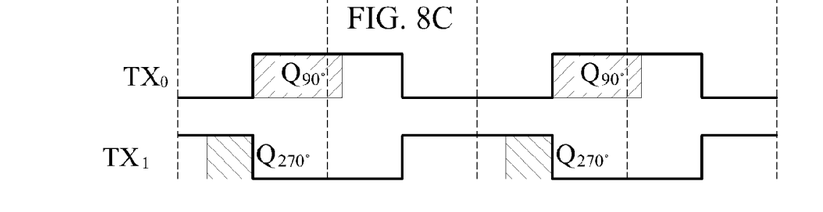

FIGS. 8A to 8C illustrate phases when the object is located nearby in a 2 tap/4 phase type, along with waveforms of control signals, according to example embodiments.

Referring to FIGS. 8A to 8C, since a time difference or phase difference $t_d$ between emitted light and reflected light is extremely small, the charge quantity Q0° of 0 degrees is greatly increased. In this case, the charge quantity Q0° may exceed the capacitance of the capacitor Cfd0.

Figure 9A:
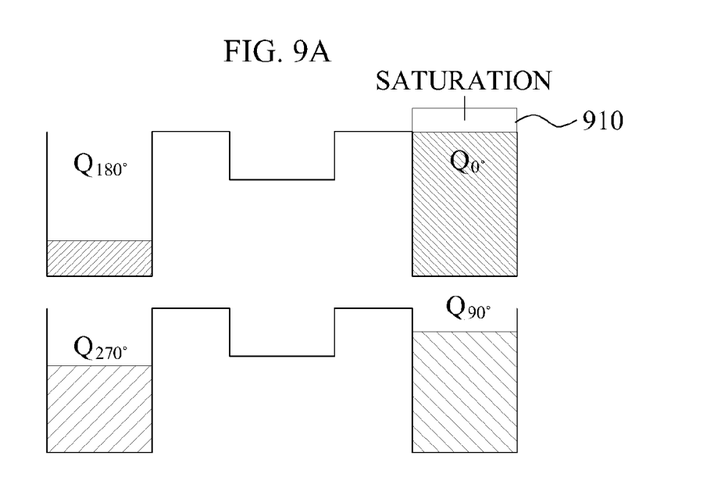
FIGS. 9A and 9B illustrate a generation process of saturation.
Figure 9B:
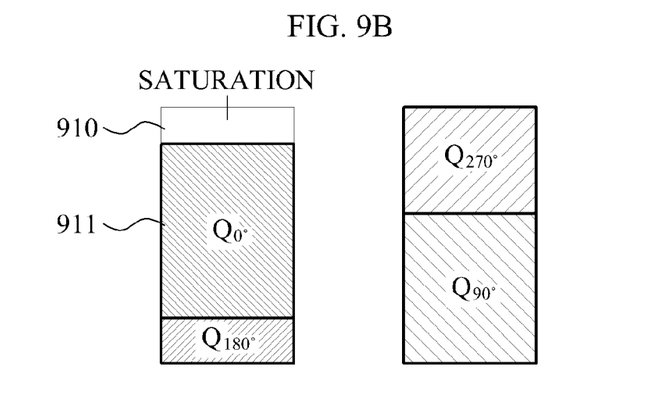

Such a situation may be referred to as pixel saturation. The pixel saturation and compensation for the pixel saturation according to the example embodiments will be described in detail with reference to FIG. 9.

FIGS. 9A and 9B illustrate a generation process of saturation.

Referring to FIG. 9A, the charge quantity Q0° is excessively large and therefore the transmitted charge quantity is larger than the capacitance of the capacitor Cfd0 by as much as an area 910. The excessive charge quantity may be lost.

Due to the lost excessive charge, the charge quantity Q0° may be measured as similar to an area 911, which is smaller than an actual value by the area 910, as shown in FIG. 9B.

Therefore, the depth value in Equation 2 may be increased and accordingly a corresponding part of the depth image may be perceived as being farther away than the actual object.

To solve the above limit, a quantity of the emitted light may be reduced, thereby reducing a quantity of the reflected light. However, in this case, noise of the depth image may be increased while accuracy is reduced. That is, quality reduction may be caused by reducing the quantity of the emitted light.

Therefore, according to the example embodiments, the compensation unit 120 of FIG. 1 may calculate the charge quantity Q0° instead of actually measuring the charge quantity Q0,° which may be incorrect due to pixel saturation. The compensation unit 120 may calculate the charge quantity Q0° using charge quantities Q90°, Q180°, and Q270° measured at three different phases, when not saturated. The calculated value may be used instead of the measured value of Q0° for depth calculation.

Thus, when the charge quantity Q0° is unreliable due to saturation, the charge quantity Q0° may be calculated using Q90°, Q180°, and Q270° as follows.

$$Q0° = Q90° + Q270° - Q180° \qquad \text{[Equation 3]}$$

Equation 3 accords to a principle that, when pixel saturation is not generated, a sum of the charge quantities Q0°+Q180° measured at 0 degrees and 180 degrees will equal a sum of the charge quantities Q90°+Q270° measured at 90 degrees and 270 degrees. Equation 3 may be easily understood through FIGS. 8B and 8C.

According to example embodiments, calculation of the grounding surface Q0° may not always be performed.

Only when the determination unit 110 of FIG. 1 determines that the charge quantity Q0° is greater than or equal to a predetermined threshold, that is, that the charge quantity Q0° is greater than the predetermined saturation level, will compensation through the calculation of the charge quantity Q0° be performed.

However, when the charge quantity Q0° is unreliable due to saturation, the charge quantity Q0° may be alternatively be obtained not only by calculation of Equation 3, but by other modified methods as well, rather than being directly measured.

A process of compensating the charge quantity Q0° has been described. Compensation of the charge quantity Q90° measured at 90 degrees may be performed in a similar manner when the charge quantity Q90° is incorrect due to the saturation. Compensation of the charge quantity Q90° may be necessary when the time difference $t_d$ becomes greater than about 50% of a duty of a control signal TX0. In this case, compensation of the charge quantity Q90° may be performed as shown in Equation 4.

$$Q90°=Q0°+Q180°-Q270° \quad \text{[Equation 4]}$$

Figure 10:
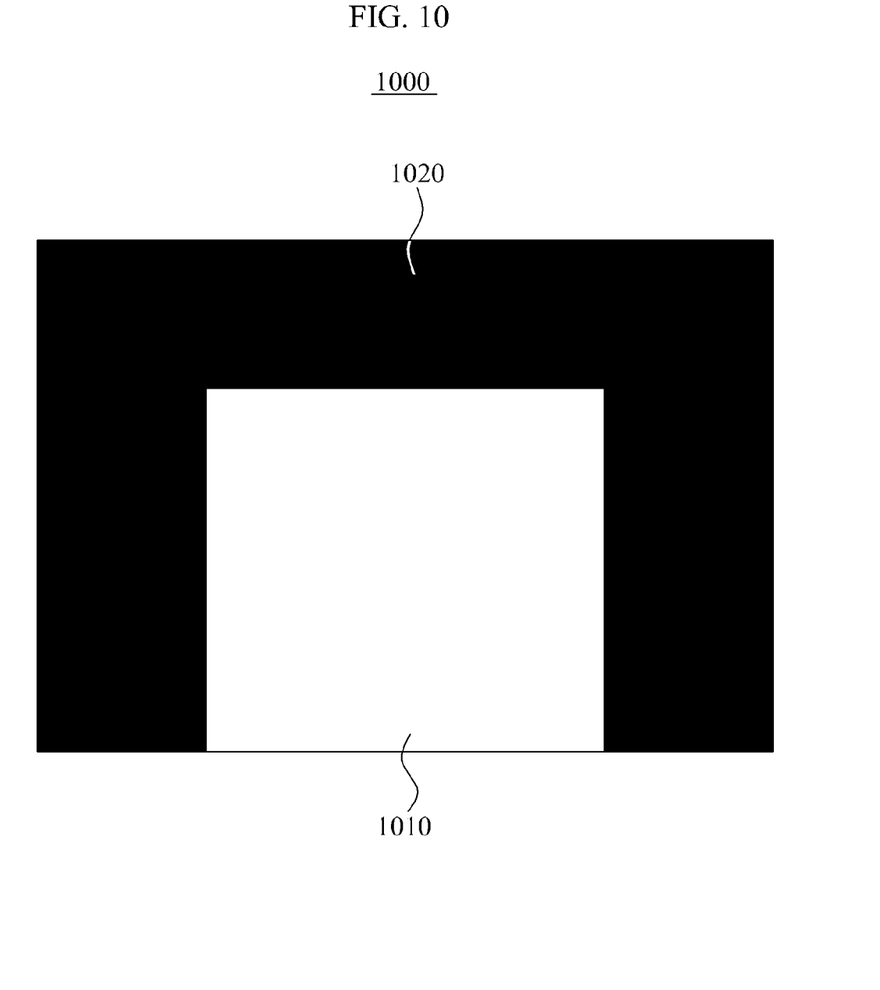
FIG. 10 illustrates a depth image obtained when saturation is generated.

FIG. 10 illustrates a diagram 1000 for explaining a depth image obtained when saturation is generated.

When saturation occurs, a depth difference may not be accurate at an object location near the light source. Therefore, while an object region 1010 and a background region 1020 are distinguished from each other, depth difference information may be lost in the object region 1010.

For example, when the charge quantity Q0° measured at 0 degrees is saturated, the saturation may be compensated for by indirectly calculating the charge quantity Q0, ° such as by using Equation 3. When the charge quantity Q0° is obtained according to the example embodiments, an accurate depth image may be generated as shown in FIG. 7.

Figure 11:
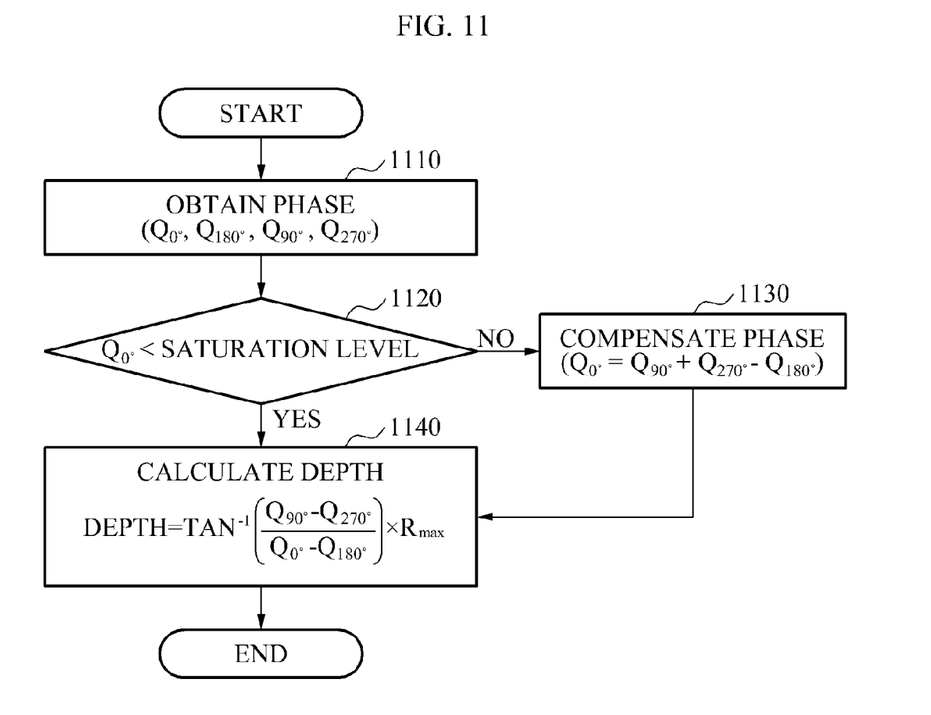
FIG. 11 illustrates a flowchart describing an image processing method according to example embodiments.

FIG. 11 illustrates a flowchart describing an image processing method according to example embodiments.

In operation 1110, the sensor 230 of the depth camera 200 may generate charges at different phases. The charge quantities are measured at the different phases.

When pixels are saturated, the image processing apparatus 100 may compensate for the saturation, thereby generating an accurate depth image.

Therefore, a process for determining pixel saturation may be performed.

In operation 1120, the determination unit 110 of the image processing apparatus 100 may determine whether the first charge storage for storing the charges generated by the sensor 230 is saturated.

The saturation state may be determined by comparing the charge quantity Q0° with a predetermined saturation level.

As a result of the determination, when the charge quantity Q0° is smaller than the saturation level and it is determined that pixel saturation has not occurred, the pixel value may be calculated using Equation 2 in operation 1130.

However, when the charge quantity Q0° is greater than or equal to the saturation level and therefore it is determined that the pixel saturation has occurred, the charge quantity Q0° may be compensated using Equation 3 in operation 1130.

Next, operation 1140 may be performed using the compensated charge quantity Q0°.

The preceding operations have been described above in detail with reference to FIGS. 2 to 10.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations and methods described above, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatusses described herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An image processing apparatus comprising:
a memory storing program instructions; and
a processor configured to execute the program instructions to,
determine whether a measured value of a first charge quantity generated by a sensor and stored at a first phase is greater than or equal to a threshold value associated with a saturation level;
calculate a new value of the first charge quantity from a second charge quantity stored at a second phase based on a determination that the measured value of the first charge quantity is greater than or equal to the threshold value associated with the saturation level; and
generate a depth image using the calculated new value of the first charge quantity.

2. The image processing apparatus of claim 1, wherein the second charge quantity includes a charge quantity stored at a plurality of phases different from the first phase, among a plurality of phases at which the charges generated by the sensor are stored.

3. The image processing apparatus of claim 2, wherein the plurality of phases include 0 degrees which is a reference phase, 90 degrees, 180 degrees, and 270 degrees, each of which are different from the reference phase.

4. The image processing apparatus of claim 3, wherein the first phase is any one of the 0 degrees and the 90 degrees.

5. The image processing apparatus of claim 4, the processor configured to execute the program instructions to calculate the new value of the first charge quantity based on subtracting a charge quantity of the 180 degrees from a sum of a charge quantity of the 90 degrees and a charge quantity of the 270 degrees, when the first phase is 0 degrees.

6. The image processing apparatus of claim 1, the processor configured to execute the program instructions to generate the depth image using a time of flight (TOF) method.

7. The image processing apparatus of claim 1, wherein the saturation level is associated with a capacitance of a charge storage, the charge storage being configured to store charges generated by the sensor.

8. The image processing apparatus of claim 7, wherein the saturation level is smaller than the capacitance by a margin.

9. An image processing method comprising:
calculating a new value of a first charge quantity generated by a sensor and stored at a first phase from a second charge quantity stored at a second phase when a measured value of the first charge quantity is greater than or equal to a threshold value associated with a saturation level; and
generating a depth image using the calculated new value of the first charge quantity.

10. The image processing method of claim 9, wherein the second charge quantity includes a charge quantity stored at a plurality of phases different from the first phase, among a plurality of phases at which the charges generated by the sensor are stored.

11. The image processing method of claim 10, wherein the plurality of phases include 0 degrees which is a reference phase, 90 degrees, 180 degrees, and 270 degrees, each of which are different from the reference phase.

12. The image processing method of claim 11, wherein the first phase is any one of the 0 degrees and the 90 degrees.

13. The image processing method of claim 12, wherein the compensating includes calculating the new value of the first charge quantity based on subtracting a charge quantity of the 180 degrees from a sum of a charge quantity of the 90 degrees and a charge quantity of the 270 degrees, when the first phase is 0 degrees.

14. The image processing method of claim 9, wherein the saturation level is associated with a capacitance of a charge storage, the charge storage being configured to store charges generated by the sensor.

15. A non-transitory computer readable recording medium storing program instructions executable by at least one processing device to cause the at least one processing device to implement the image processing method of claim 9.

16. A method, comprising:
determining whether a first charge quantity generated by a sensor of a depth sensing camera is saturated based on comparing the first charge quantity with a saturation level;
selectively calculating a depth value using a first technique when the first charge quantity is determined to be unsaturated; and
calculating the depth value using a second technique when the first charge quantity is determined to be saturated.

17. The method of claim 16, wherein
the first technique includes directly calculating the depth value based on the first charge quantity, and
the second technique includes indirectly calculating the depth value based on values other than the first charge quantity.

18. The method of claim 17, wherein
the first charge quantity is stored at a first phase, and
the second technique includes calculating the first charge quantity stored at the first phase from a second charge quantity stored at a second phase.

19. An apparatus, comprising:
a memory storing program instructions; and
at least one processor configured to execute the program instructions to
determine whether a measured value of a first charge quantity generated by a sensor of a depth sensing camera is greater than or equal to a threshold value associated with a saturation level;
calculate a new value of the first charge quantity from a second charge quantity based on a determination that the measured value of the first charge quantity is greater than or equal to the threshold value associated with the saturation level; and
generate a depth value using the calculated new value of the first charge quantity.

20. The apparatus of claim 19, wherein the memory and the at least one processor are embodied within the depth sensing camera.

21. An image processing apparatus comprising:
a memory storing program instructions; and
a processor configured to execute the program instructions to,
calculate a new value of a first charge quantity generated by a sensor and stored at a first phase from a second charge quantity stored at a second phase; and
generate a depth image using the calculated new value of the first charge quantity;
wherein the second charge quantity includes a charge quantity stored at a plurality of phases different from the first phase, among a plurality of phases including 0 degrees which is a reference phase, 90 degrees, 180 degrees, and 270 degrees, each of which are different from the reference phase;

the processor further configured to execute the program instructions to calculate the new value of the first charge quantity based on subtracting a charge quantity of the 180 degrees from a sum of a charge quantity of the 90 degrees and a charge quantity of the 270 degrees, when the first phase is 0 degrees.

* * * * *